(12) United States Patent
Viken

(10) Patent No.: US 6,223,790 B1
(45) Date of Patent: May 1, 2001

(54) AUTO-LOADING FLUID EXCHANGER AND METHOD OF USE

(76) Inventor: James P. Viken, 9890 Crestwood Ter., Eden Prairie, MN (US) 55344

( * ) Notice: Subject to any disclaimer, the term of this patent is extended or adjusted under 35 U.S.C. 154(b) by 0 days.

(21) Appl. No.: 09/301,851

(22) Filed: Apr. 29, 1999

Related U.S. Application Data

(60) Provisional application No. 60/083,557, filed on Apr. 29, 1998.

(51) Int. Cl.[7] ............................................. B65B 1/04
(52) U.S. Cl. .................................... 141/98; 141/65; 141/59; 184/1.5
(58) Field of Search ............................ 141/98, 192, 65, 141/59; 184/1.5

(56) References Cited

U.S. PATENT DOCUMENTS

| | | | |
|---|---|---|---|
| Re. 36,650 | 4/2000 | Viken | 184/1.5 |
| 2,951,450 | 9/1960 | Fisher | 103/223 |
| 3,513,941 | 5/1970 | Becnel | 184/1.5 |
| 3,849,033 | 11/1974 | Schall | 417/454 |
| 4,123,204 | 10/1978 | Scholle | 417/393 |
| 4,386,888 | 6/1983 | Verley | 417/393 |
| 4,478,560 | 10/1984 | Rupp | 417/393 |
| 4,548,551 | 10/1985 | Ruttenberg et al. | 417/393 |
| 4,869,346 | 9/1989 | Nelson | 184/1.5 |
| 5,232,352 | 8/1993 | Robinson | 417/393 |
| 5,318,080 * | 6/1994 | Viken | 141/98 |
| 5,337,708 | 8/1994 | Chen | 123/198 |
| 5,361,870 * | 11/1994 | Courcy | 184/1.5 |
| 5,370,160 | 12/1994 | Parker | 141/98 |
| 5,447,184 | 9/1995 | Betancourt | 141/98 |
| 5,505,593 | 4/1996 | Hartley et al. | 417/393 |
| 5,522,474 * | 6/1996 | Burman | 184/1.5 |
| 5,616,005 | 4/1997 | Whitehead | 417/46 |
| 5,641,003 | 6/1997 | Rey et al. | 141/1 |
| 5,806,629 | 9/1998 | Dixon et al. | 184/1.5 |
| 5,871,068 | 2/1999 | Selby | 184/1.5 |
| 5,918,647 | 7/1999 | Liaw | 141/98 |
| 6,035,903 | 3/2000 | Few et al. | 141/98 |

* cited by examiner

*Primary Examiner*—Steven O. Douglas
(74) *Attorney, Agent, or Firm*—Larkin, Hoffman, Daly and Lindgren, Ltd.; John F. Klos

(57) ABSTRACT

This invention provides a fluid system for exchanging used hydraulic fluid with fresh hydraulic fluid in an accessed hydraulic circuit. One particular application provides an exchange apparatus for exchanging fluids of the type found in motor vehicle hydraulic circuits. The exchange apparatus may utilize pressurized spent fluid flow as a fluid power medium to activate the auto-replenishing fluid exchanger system to replace the spent fluid with fresh fluid at equalized flow rates. Alternatively, the exchange apparatus may utilize pressurize fresh fluid as a fluid power medium to activate the exchange system. Additional power may be supplied by an external boost pump to supplement the flow of fluid.

21 Claims, 11 Drawing Sheets

AUTO-LOADING FLUID EXCHANGER AND METHOD OF USE

CROSS REFERENCE TO RELATED APPLICATION

This application claims the benefit of priority pursuant to 35 U.S.C §119(e)(1) from the provisional patent application filed pursuant to 35 USC §111(b): as Ser. No. 60/083,557 on Apr. 29, 1998.

BACKGROUND OF THE INVENTION

1. Field of the Invention

This invention relates generally to fluid exchange systems and in particular to those useful in the exchanging of fluids of the types found in motor vehicles and pressurized hydraulic systems. Disclosed herein is a fluid exchange apparatus wherein used hydraulic fluid is exchanged for fresh fluid by interposing the invention in-line with a hydraulic fluid circulation circuit. The exchange apparatus may utilize pressurized spent fluid flow as a fluid power medium to activate the auto-replenishing fluid exchanger system to replace the spent fluid with fresh fluid at equalized flow rates. Alternatively, the exchange apparatus may be externally powered to replace the spent fluid with fresh fluid at equalized flow rates.

2 Related Background Art:

A variety of hydraulic fluid exchange systems are known to those skilled in the art. One early example is the applicant's U.S. Pat. No. 190 5,318,080, which featured a pressure vessel divided into two chambers by a flexible diaphragm (See, FIG. 3). To refill this exchange system with fresh fluid in preparation for the exchange operation, fresh fluid was introduced into one chamber causing the diaphragm to distend and simultaneously force the spent fluid out of the second chamber. A particular characteristic of this device was the limited volumetric capacity of the pressure vessel, as the capacity of fluid exchange was substantially equal to the volume of the contained fresh fluid prior to the exchange process. If the volume of fresh fluid contained in fresh-fluid charged receiver was less than the desired exchange capacity, one would have to interrupt the exchange process upon discharge of the fresh fluid load, recharge the receiver with fresh fluid, and then reinstate the exchange process until the desired fluid capacity was exchanged. Merely increasing the volumetric capacity of the fluid receiver would concomitantly increase manufacturing costs, fluid friction losses, and the overall size of the exchange apparatus. As a result, the efficiency of such a device was limited by the volume of fresh fluid the device was able to contain.

An additional limitation of prior art exchange systems has been the requirement of onboard fluid tanks for holding fresh fluid and used fluid requirements. These tanks increase the overall size and weight of an exchange apparatus, making movement and storage of the fluid exchange apparatus burdensome.

SUMMARY OF THE INVENTION

The present invention solves many of the problems existent in prior hydraulic fluid exchange systems. The present invention provides a compact fluid exchange system having a fluid receiver which is substantially smaller than the amount of fluid exchanged during the exchange process. As the size of the fluid receiver in the present invention is not related to the volume of ultimately fluid exchanged, the apparatus can be used to service hydraulic fluid systems having a variety of circuit sizes, configurations, etc.

Briefly, the invention includes a reciprocating pump assembly having a pair of pumping chambers and a pair of working chambers. The pump assembly operates to receive used fluid from an accessed hydraulic fluid circuit into one of the working chambers, introduce fresh fluid from a pumping chamber into the hydraulic fluid circuit, simultaneously refill the other pumping chamber with fresh fluid, and simultaneously discharge spent fluid from the other working chamber into a spent fluid receptacle. Fluid flow relative to the pump assembly is directed by a control structure. This reciprocating pump assembly cycles until the predetermined exchange volume is satisfied (determined by such means as visual or optical comparison of fluid input and output, sensor devices, etc.). The invention permits connection to both a bulk fresh fluid supply and a floor drain, such as those typically found in vehicle repair facilities.

One object of the invention includes a reciprocating pump assembly having a power medium of a pressurized hydraulic fluid, such as used transmission fluid of an operating motor vehicle during a maintenance procedure, or pressurized fresh fluid from an external source.

One object of the invention provides a fluid exchange apparatus released from the requirement of having dedicated on-board fluid reservoirs. A remote bulk fresh fluid supply and remote waste fluid receptacle, such as those found in vehicle repair facilities, may be utilized to practice the present invention. In this manner, a smaller, more compact fluid exchange apparatus is provided.

One object of the present invention permits an efficient change between different fresh fluids (grades, additive packages, etc.) between or during exchange procedures. The limited volumetric capacity of the pump assembly and associated conduit results in a limited amount of the previous different fresh fluid charge held within the exchange apparatus.

Another object of the invention includes a reciprocating pump assembly having an external power source, such as an electric motor, for powering or assisting in the powering of the pump assembly. Additionally, a booster pump assembly may be provided to assist in the exchange procedure for certain hydraulic environments, such as low flow or pressure systems.

Yet another object of the invention provides a range of pump assembly structures for practicing the invention. The pump assembly structures may include a linear pump assembly, a displaced piston/crank assembly, and a rotor pump assembly. These and other objects, features and advantages of the present invention will become apparent to one skilled in the art upon analysis of the following detailed description in view of the drawings.

DESCRIPTION OF THE DRAWINGS

The present invention will be described hereafter in the Detailed Description of Preferred Embodiments, taken in conjunction with the following drawings, in which like reference numerals refer to like elements throughout.

DETAILED DESCRIPTION OF PREFERRED EMBODIMENTS

Figure 1:
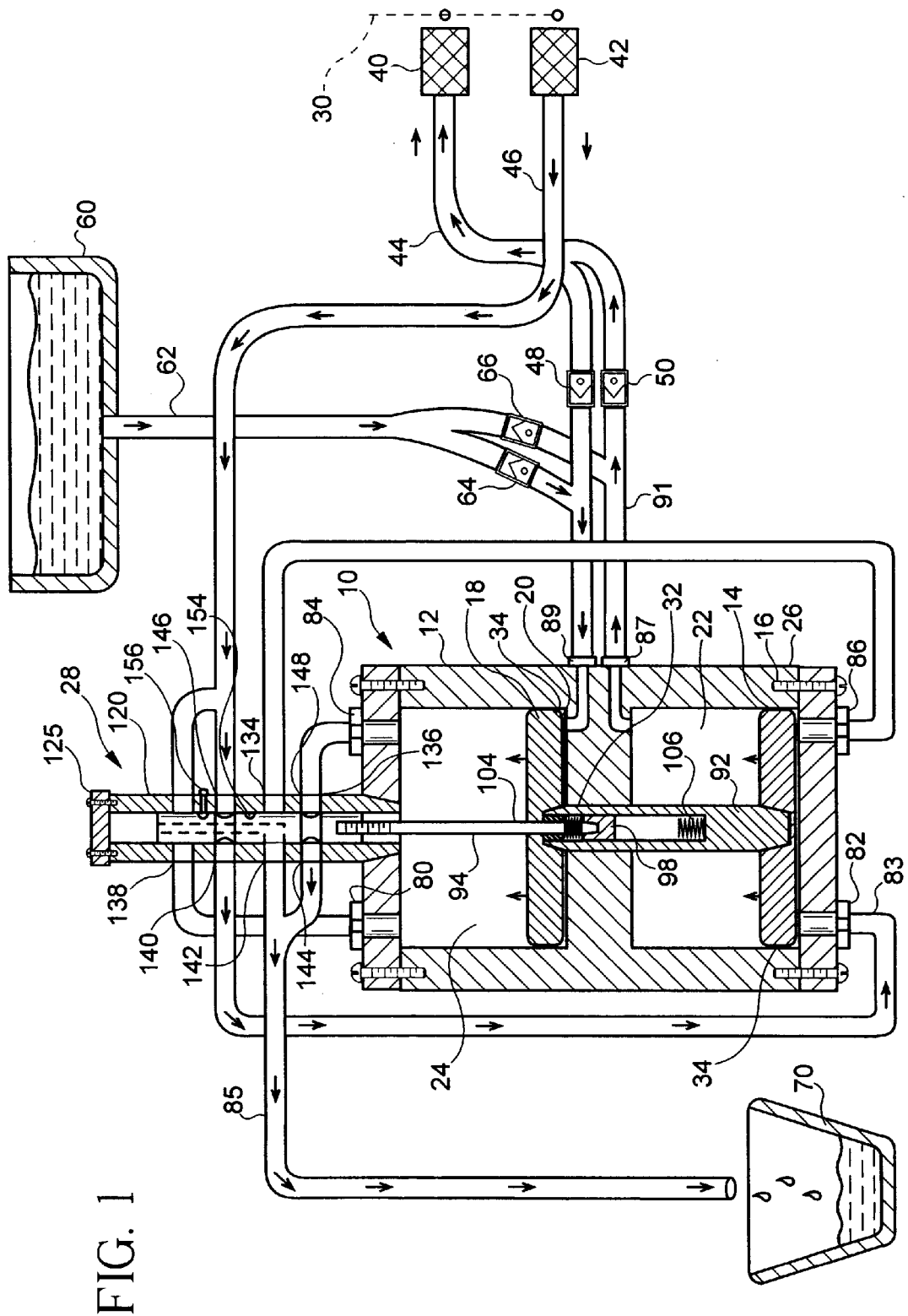
FIG. 1 schematically illustrates a fluid exchange system according to the present invention.

As shown in FIG. 1, the invention of the present application includes a reciprocating pump assembly 10 having a rigid cylinder body 12 and an interiorly-received dual fluid separation structure 14. In this preferred embodiment the dual fluid separation structure 14 is a dual piston 16, 18 assembly. The cylinder body 12 and dual piston assembly 14 together define two pumping chambers 20, 22 disposed substantially between the outer piston ends 16, 18 of the dual piston assembly 14. Two working chambers 24, 26 are also defined and are disposed away from the pumping chambers 20, 22 and within the cylinder body 12. The working chambers 24, 26 receive pressurized fluid from an accessed hydraulic circuit 30. Fluid flow relative to the pump assembly 10 is controlled by an actuated control valve assembly 28. The pressurized fluid, used as a power medium to drive the reciprocating pump 10, may be automatic transmission fluid of an operating vehicle. The pumping chambers 20, 22, on the other hand, simultaneously introduce fresh fluid into the accessed hydraulic circuit 30 (e.g., transmission cooling circuit). The pumping chambers 20, 22 are interconnected by a guide bore 32 which passes through the cylinder body 12. In operation, the volumes of each of the chambers 20, 22, 24, 26 are variable and determined by the relative position of the dual piston assembly 14 within the cylinder assembly 12. Minimal fluid is lost across the chamber sealing surfaces 34. Sealing surfaces 34 may include rings or seals as selected by those skilled in the art. In this embodiment, the working chambers 24, 26 are coaxial with the pumping chambers 20, 22. It should be appreciated that the working chambers 24, 26 and pumping chambers 20, 22 are of a substantially cylindrical shape in this preferred embodiment, however, other configurations are possible. Additionally, the dual fluid separation structure 14 could be a dual diaphragm assembly or other structures disclosed hereinafter.

As more fully described herein, the pump assembly 10 is interconnected to an accessed hydraulic fluid circuit 30 through quick-connect fluid couplers 40, 42, fluid conduits 44, 46, and associated unidirectional check valves 48, 50. Used hydraulic fluid from the accessed hydraulic circuit 30 enters the exchange apparatus through quick-connect coupler 42 and a fresh hydraulic fluid flows out of the exchange apparatus and through quick-connect coupler 40. The flow rate of the used and fresh hydraulic fluid is substantially equivalent during the exchange process. The pump assembly 10 is additionally coupled to a bulk fluid reservoir 60 or similar external fresh fluid source through associated fluid conduit 62 and unidirectional check valves 64, 66. The pump assembly 10 is additionally coupled to an external used fluid receptacle 70, such as an oil drain or external tank of typical vehicle maintenance facilities. A flow alignment device, as illustrated in applicant's existing U.S. Pat. No. 5,472,064, may be utilized to practice the present invention. This reference is incorporated herein entirety for all purposes.

Still referring to FIG. 1, a plurality of orifices 80, 82, 84, 86, 87, 89 are interconnected to the pump assembly 10 at the pumping chambers 20, 22 and the working chambers 24, 26, each of which is adapted to provide fluid communication from or into respective pumping chambers 20, 22 or working chambers 24, 26. Working chambers 24, 26 are fluidly coupled to receive used hydraulic fluid from the accessed hydraulic circuit 30 through ports 80 and 82. Working chambers 24, 26 are additionally fluidly coupled to permit discharge of the used hydraulic fluid to the external used fluid receptacle 70 through ports 84 and 86. As described herein, the fluid flow through respective fluid ports 80, 82, 84, 86 is controlled by a spool valve assembly 28. Depending on the local pressure conditions, pumping chambers 20, 22 are fluidly coupled to either the fresh fluid source 60 or the outlet conduit 44.

Figure 2:
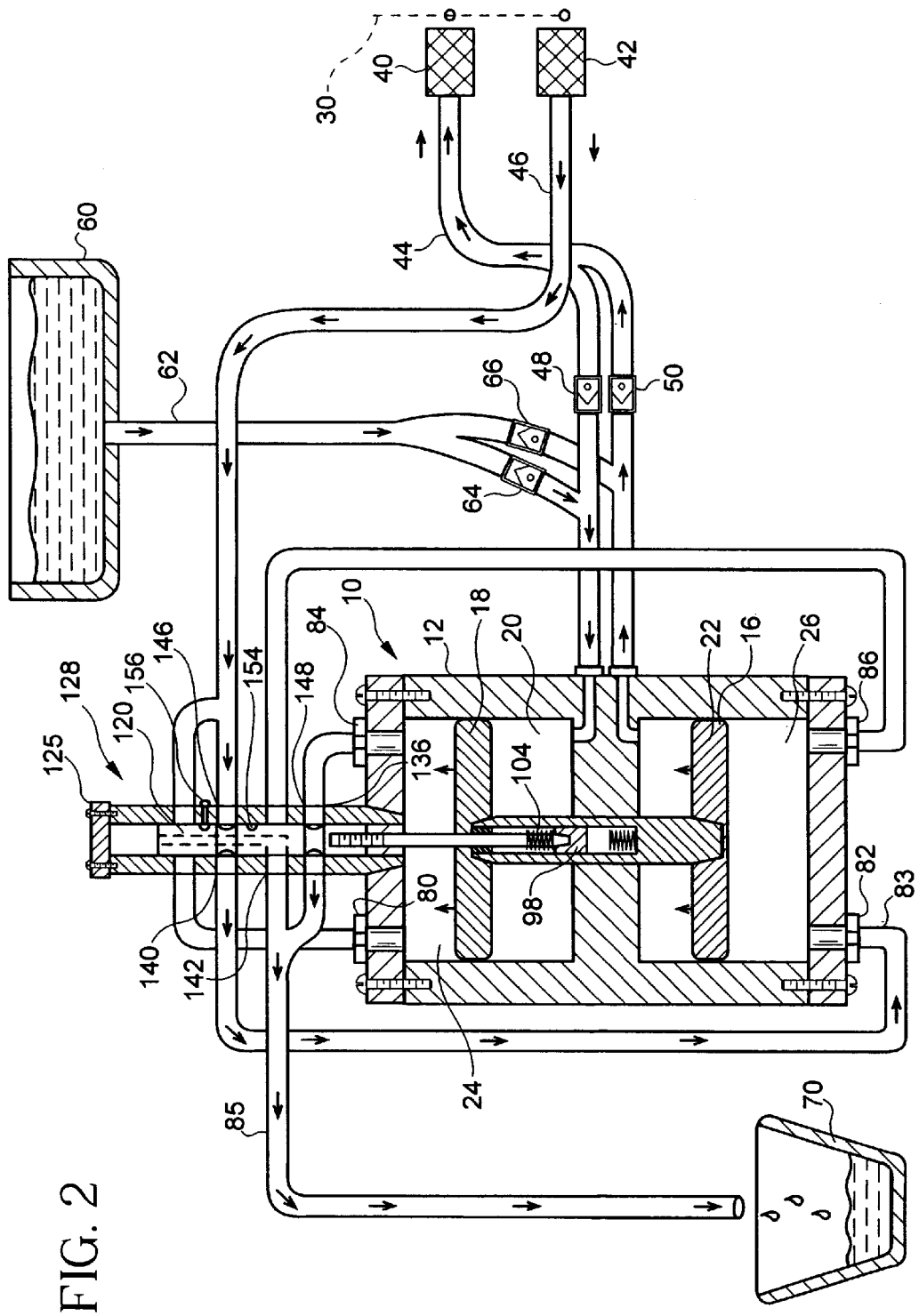
FIG. 2 schematically illustrates the fluid exchange system of FIG. 1 at a later point in time.
Figure 3:
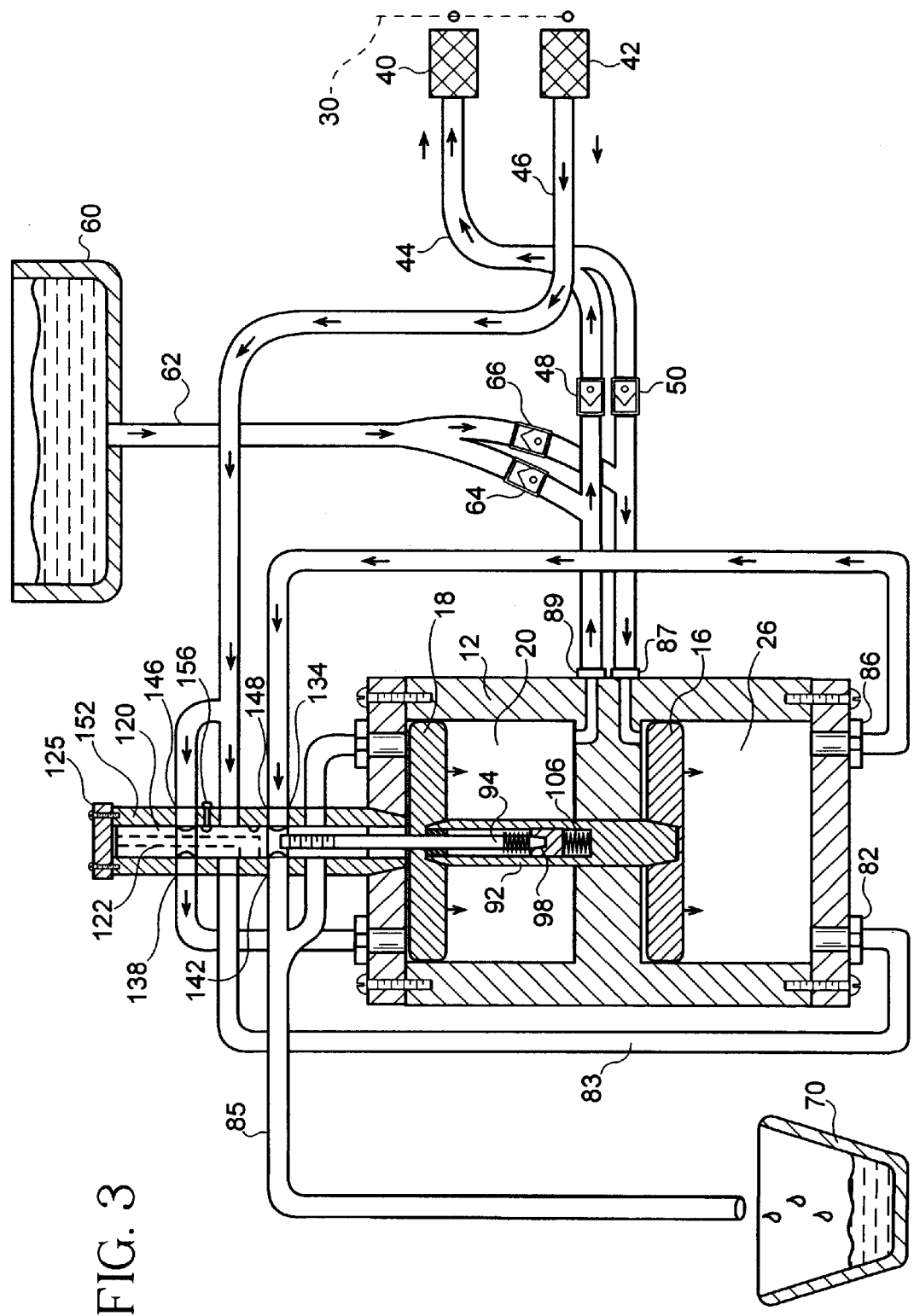
FIG. 3 schematically illustrates the fluid exchange system of FIG. 2 at a later point in time.

In FIGS. 1–3, the present invention is illustrated in schematic, cross-sectional views with arrows schematically depicting fluid flow. Disposed within the cylinder block 12 is the dual fluid separation structure 14, here illustrated as a dual piston structure 16, 18. Alternatively, a dual diaphragm structure (not shown) may be utilized. The diaphragms may be made of a flexible material such as a rubber-like or other conventional material and may be secured or attached by conventional means to the cylinder body 12 in a manner that a seal is formed between the respective working chambers 24, 26 and pumping chambers 20, 22.

Figure 5:
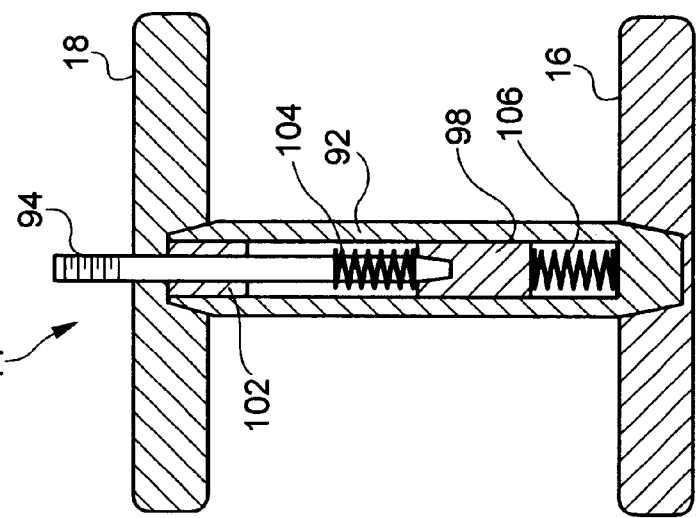
FIG. 5 is an elevational view of particular components of the fluid exchange system of FIG. 1.
Figure 4:
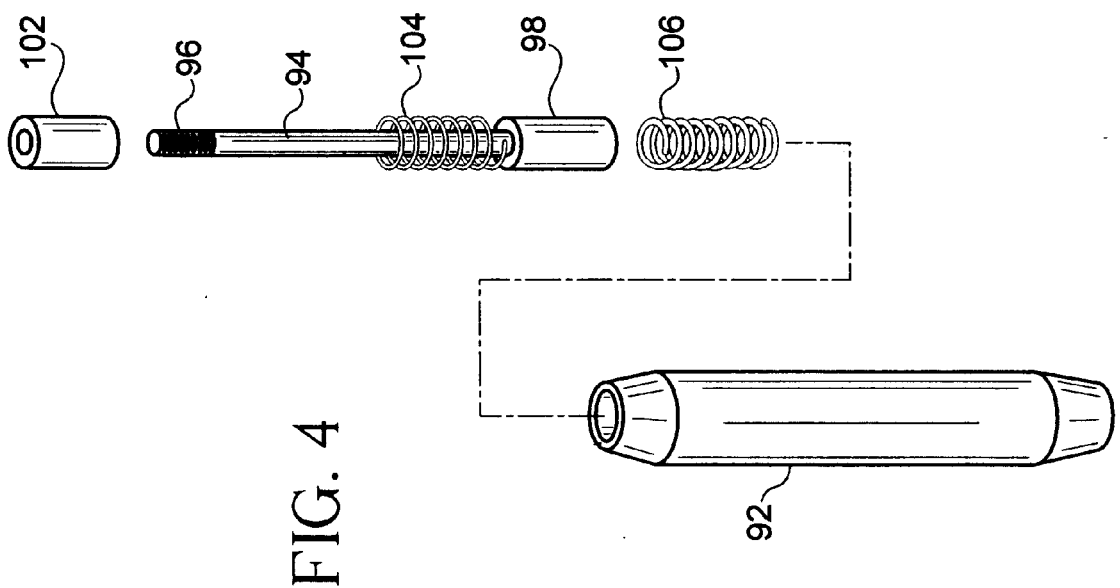
FIG. 4 is an elevational view of particular components of the fluid exchange system of FIG. 1.

Referring now to FIGS. 4 and 5, the dual piston assembly 14 and a control valve actuation assembly 90 are illustrated. The dual piston structure 14 has a rod 92 interconnecting the two opposed pistons 16,18. The connecting rod 92 is threadedly secured at each end to an associated piston 16,18. The center rod 92 is hollow and interiorly receives a control rod 94 operatively coupled to the control valve assembly 90. The control rod 94 includes a first end 96 having threads and a second enlarged end 98. The enlarged second end 98 is sized to be slidingly received into the interior of the connecting rod 92. A threaded bushing 102 secures the enlarged end 98 of the control rod 94 within the connecting rod 92. A pair of coil springs 104, 106 are also disposed within the connecting rod 92. The coil springs 104,106 are disposed at either side of the enlarged portion 98 of the control rod 94. In combination, the control rod 94 (and hence, spool valve 120) is linearly displaced under forces imparted by either of the coil springs 104, 106 as transferred by the dual piston assembly 14.

Figure 6:
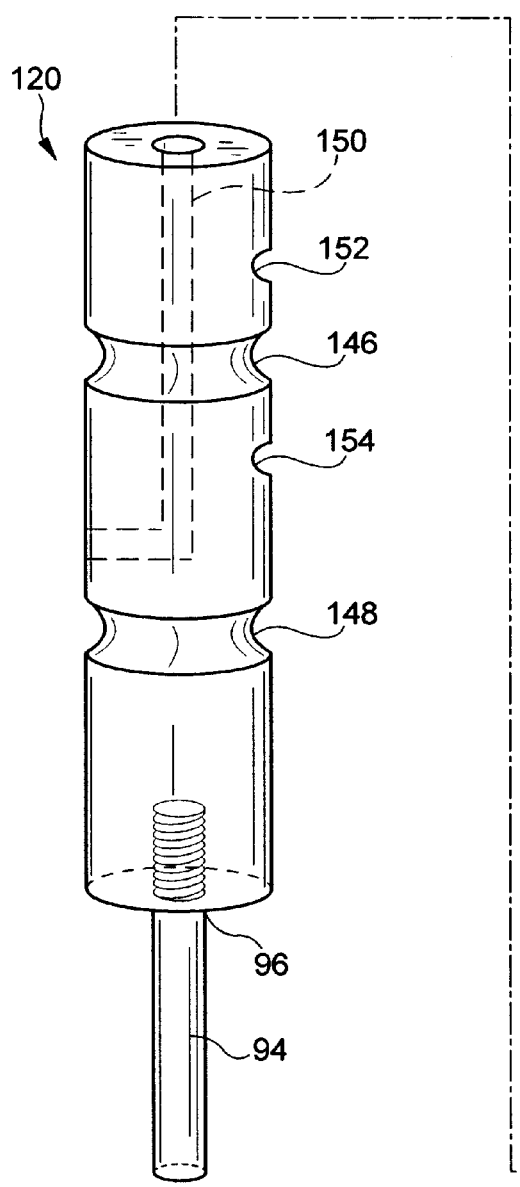
FIG. 6 is a perspective view of particular components of the fluid exchange system of FIG. 1.
Figure 7:
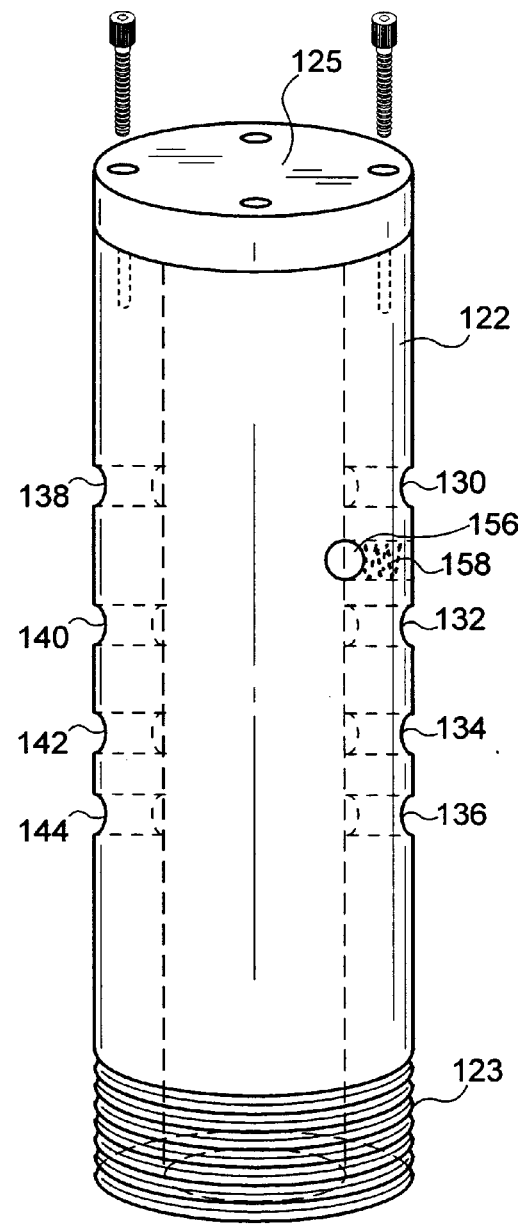
FIG. 7 is a perspective view of particular components of the fluid exchange system of FIG. 1.

Referring now to FIGS. 6 and 7, the control valve assembly 28 for directing fluid flow relative to the pumping assembly 10 is illustrated in perspective view. Control valve assembly 28 includes an actuated spool or spool valve 120, valve body 122 and cap 125. Valve body 122 includes a plurality of ports 132, 134, 136, 138, 140, 142, 144 providing fluid communication through the valve assembly 28. Valve body 122 is threadedly secured at a first end 123 to the cylinder body 12 of the pump assembly 10. Spool valve 120 is slidably received into the valve body 122. Spool valve 120 includes a plurality of concentric fluid passageways 146,148 which permit fluid to communicate between opposed ports 130-144 of the valve body 122. Additionally, spool valve 120 includes a vent passageway 150 for permitting fluid disposed between the upper face of the spool valve 120 and valve body 122 to be discharged to the used fluid receptacle 70. Alternative venting approaches may be appreciated by those skilled in the art, and include external vents, relief valves, etc.

Still referring to FIGS. 6 and 7, spool valve 120 includes a pair of semi-spherical depressions 152, 154 sized to receive a portion of an encased ball 156 disposed on the valve body 122. The encased ball 156 is inwardly biased by a spring 158 to engage the depressions 152, 154. Together in combination the valve depressions 152, 154, encased ball 156, and spring 158 form a pair of detent stops for limiting the position of the spool valve 120 within the valve body 122. Linear movement of the spool valve 120 results only upon exceeding a resistive force of the detent stops. Upon overcoming the detent reaction force, the spool valve 120 displaces within the valve body 122 until it reacts at either a top or bottom surface of the valve body 122. In this manner, the detent stops tend to restrict the relative position of the spool valve 120 within the valve body 122 to one of two majority positions, illustrated either in FIGS. 1 and 2 or in FIG. 3. Alternative control valve structures may be readily appreciated by those skilled in the relevant arts. One example of a non-piston actuated control structure is described hereinafter with reference to FIG. 8.

Operation of the Embodiment of FIGS. 1–7

The closed fluid circulation system of an automatic transmission or other hydraulic fluid circuit 30 is accessed to provide fluid interconnection of the invention such that used fluid can be received from the fluid circuit 30 and fresh fluid can be simultaneously introduced by the invention to thereby replace the spent fluid. Suitable adapters (not shown) terminating in quick connectors are utilized to allow quick and convenient connection of conduit to a spent fluid outlet side of the accessed fluid circuit and to the return line side of the fluid circuit. When the internal fluid pump (which pressurizes the fluid circuit) is rendered operative, spent fluid is received into the pump assembly 10 at one of the working fluid chambers 24, 26 selected by the spool valve assembly 28 (based on the existing position of spool valve 120). Referring to FIG. 1 (illustrating fluid conditions immediately after spool valve 120 transitioned to the position of FIG.1), used fluid from the transmission circuit 30 is introduced into the lower working fluid chamber 26 through port 82 from conduit 83 through the spool valve assembly 28. The used fluid cannot be vented out of the used fluid chamber 26 since the spool valve 28 blocks fluid from port 86. Therefore, as the used fluid enters working fluid chamber 26 through port 82, piston assembly 14 is forced upward. As piston assembly 14 is upwardly displaced, each of the four fluid chambers 20, 22, 24, 26 simultaneously experience a change in volumetric conditions: the upper working fluid chamber 24 is discharging used fluid to a used fluid receptacle 70, the upper pumping chamber 20 is receiving a charge of fresh fluid from the fresh fluid reservoir 60, the lower working chamber 26 is receiving used fluid from the accessed transmission circuit 30, and the lower pumping chamber 22 is introducing fresh fluid into the accessed transmission circuit 30.

More specifically, used fluid in the upper working chamber 24 is forced out of port 84 and through passageway 148 of the control valve 120 and through conduit 85 to the used fluid receptacle 70. Fresh fluid is drawn into the upper pumping chamber 20 from the fresh fluid reservoir 60 through conduit 62 and check valve 64. The lower working pumping chamber 26 is receiving used fluid from the accessed transmission circuit 30 through conduit 46 and passageway 146 of control valve assembly 120. The lower pumping chamber 22 forces new fluid out of port 87 through conduit 91 through check valve 50 through conduit 44 and into the return line side of the accessed transmission circuit 30. Check valve 66 prevents fresh fluid from pumping chamber 22 from flowing back into the fresh fluid reservoir 62 through conduit 63.

FIGS. 2 and 3 schematically illustrate the exchange apparatus of FIG. 1 at later points in time. Piston assembly 14 is illustrated in further upwardly displaced position relative to FIG. 1. Referring to FIG. 2, the control valve assembly 120 remains in its position of FIG. 1, as the second end 98 of the control rod 94 has not yet contacted the lower coil spring 106. As piston assembly 14 nears the end of its motion upward, the coil spring 106 is contacted and compressed which creates an increasing actuation force on the valve spool 120. As piston assembly 14 continues to move upwardly, coil spring 106 is further compressed and overcomes the resistive force of the detent assembly. Referring to FIG. 3, once the detent force is exceeded, the control spool 120 transitions to its upper detented position. This reverses the cycle of the pump assembly 10 and causes the piston assembly 14 to downwardly move under pressure of the used fluid (introduced into the upper working fluid chamber 24 through port 80) from the accessed transmission circuit 30. The piston assembly 14 continues to downwardly move until the second end 98 of the control rod 94 reacts against the upper coil spring 104, biasing the control spool 120 downward back into the position of FIGS. 1 and 2. The cycle illustrated in FIGS. 1–3 thus repeating. This process of utilizing the automatic reversing cycles is repeated until it is determined that the fluid exchange is complete, i.e., upon comparison of the fresh fluid to the used fluid exiting the accessed circuit, exhaustion of fresh fluid reservoir, etc.

Figure 8:
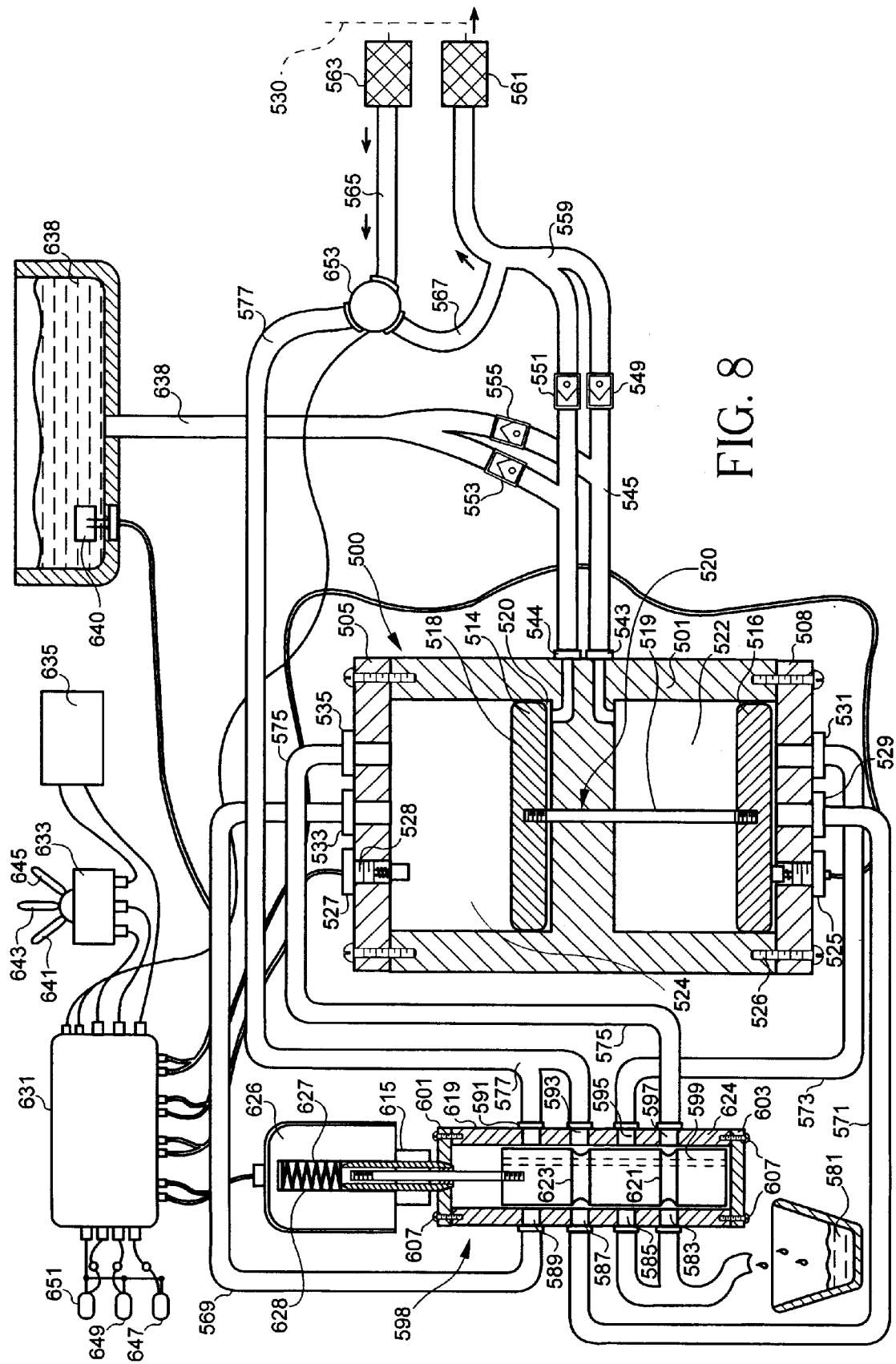
FIG. 8 schematically illustrates a second embodiment of a fluid exchange system according to the present invention.

FIG. 8 illustrates another preferred embodiment of the present invention. Used and fresh fluid flow relative the pump assembly 500 is controlled by a remote controller device and a remote spool valve assembly. A reciprocating pump assembly 500 includes a reciprocating piston assembly 514 disposed within a cylinder body 501. Cylinder body 501 is sealed with a lower cylinder end plate 503 and an upper cylinder end plate 505. End plates 503, 505 are secured by threaded fasteners 507. End plates 503, 505 are sealed to valve body 501 by a thin neoprene gasket material or other known sealing approaches. Connecting rod 519 is threadedly secured to an upper piston 518 and a lower piston 516. Connecting rod 519 is slidably received through guide bore 520 with minimal clearance to promote sealing between the pumping chambers 520, 522. Similarly, pistons 516, 518 are fitted within the cylinder body 501 with minimal clearance to promote sealing without creating excessive friction drag.

Piston 518 defines within the top half of cylinder assembly 501 a working fluid chamber 524 and a pumping fluid chamber 520. Likewise, piston 516 defines within the bottom half of cylinder assembly 500 a working fluid chamber 526 and a pumping fluid chamber 522.

End plate 505 includes two fluid ports: a used fluid power inlet port 533, a used fluid discharge port 535. End plate 505 also includes an access port 528 for receiving a threaded position sensor 527. Fluid port 533 is coupled to a used fluid inlet conduit 569. Port 535 is coupled to a used fluid discharge conduit 575.

Opposite end plate 503 includes two fluid ports: a used fluid power inlet port 529, and a used fluid discharge port 531. End plate 503 also includes an access port for receiving a threaded position sensor 525. Fluid port 529 is coupled to a used fluid conduit 571. Fluid port 531 is coupled to a fluid discharge conduit 573.

A bi-directional fluid channel 537 is provided to the upper half of cylinder body 501 and a bi-directional fluid channel 597 is provided to the lower half of cylinder body 501. Fluid channel 537 is coupled to a fresh fluid two-way conduit assembly 547 through port 544. Channel 539 is connected to a fresh fluid two-way conduit assembly 545 through port 543.

A check valve 553 is disposed between conduit 547 and fresh fluid supply conduit 557. Fresh fluid supply conduit is also connected through check valve 555 to conduit 545. Conduit 545 is coupled to a fresh fluid discharge conduit 559 by a check valve 549. Conduit 559 is connected to conduit 547 by check valve 551.

Conduit 559 is coupled at one end to a female quick connector 561, and a conduit 565 is connected at one end to a female quick connector 563. Conduit 565 is coupled at another end to an electrically-operated three-way flow direction selector valve assembly 653 through an inlet port 659. Valve 653 is coupled to conduit 559 through a fluid bypass outlet port 657. Valve 653 is coupled to a used fluid inlet conduit 577 at an outlet port 655. Conduit 557 is connected to a fresh fluid supply reservoir 638. Reservoir 638 includes a float level switch 640 for signaling a low fluid level condition of the reservoir 638.

A control valve assembly 598 includes a multiple ported valve body 599, and an interiorly-received spool valve 619 maintained between end plates 601, 603. End plates 601, 603 are secured to valve body 599 by threaded fasteners 607. An electric solenoid assembly 626 is disposed relative the valve body 599. Solenoid assembly 626 includes an electric coil 627, and a rod 615 for actuating the spool valve 619. Spool valve 619 includes a circumferential fluid channel 621, a circumferential fluid channel 623, and a vent passage way 624.

Used fluid conduit 575 couples control valve assembly 598 at port 597 to the upper working fluid chamber 524. Used fluid conduit 573 couples control valve assembly 598 at port 595 to the lower working fluid chamber 526. Fresh fluid conduit 577 couples control valve assembly 598 at ports 591, 593 to circuit 530. Used fluid conduit 569 couples control valve assembly 598 at port 589 to the upper working fluid chamber 524. Used fluid conduit 571 couples control valve assembly at port 587 to the lower working fluid chamber 504. A used fluid conduit 579 couples control valve assembly 598 at ports 583, 585 to used fluid receptacle 581.

A microprocessor/controller assembly 631 receives signals from an activation switch 633, position sensors 525, 527 and fluid level sensor 640, and resultantly controls peripheral mechanisms 598, 653. A power supply 635 may be a 12 volt electrical system of the vehicle being serviced. Microprocessor 631 is provided with an LED power-on indicator 647, an LED exchange-on indicator 649, and an LED bypass indicator 651. Switch 633 is shown with three position configurations; a first switch position 641, a second switch position 643; and a third switch position 645.

Valve 653 provides a bypass configuration (fluid conduit 565 coupled to bypass conduit 657) for immediately returning used fluid to the accessed hydraulic circuit and an operative configuration (fluid conduit 565 coupled to conduit 577) for introducing fluid to the pump assembly 500.

Similar to the before described piston-based reciprocating fluid exchanger, the piston based reciprocating pump assembly 500 and the control valve assembly 598 of the fluid exchanger of FIG. 8 can be constructed of a wide range of materials, including aluminum or magnesium alloys, steel alloys, plastic or polymer, and composite materials. Particular selection of materials for the pump assembly 500 are well within the scope of knowledge possessed by those skilled in the relevant arts.

Fresh fluid supply conduit 638 can be connected to a gravity feed tank system or can be connected to a pressurized fluid feed system. An additional feature may include a pump (not shown) to augment the flow of conduits 559 or 565 (preferably 565 since this tends to be more effective by providing more direct augmentation of low flow through the unit 500). A pump must be arranged to have proper flow alignment with the fluid conduit 565, and may require a variable or fixed bypass. A variable pump would be controllable to provide fluid boost no greater than the output available from the fluid circulation circuit without creating cavitation in the internal pumping mechanism(s) of accessed hydraulic system or any other type of damage such as damage to the integrity of any internal sealing. A fixed boost pump would be set to offset the fluid resistance of the exchange unit.

Additional features of the microprocessor system may include volume of exchange displays, fluid clarity displays, fluid pressure displays, etc. Fluid clarity of the used fluid relative to the new fluid can be monitored for control purposes.

Operation of the microprocessor operated embodiment of FIG. 8

Fresh fluid reservoir 638 is filled with fresh fluid to activate float switch 640. Power supply 635 is activated. Switch 633 is moved from its position 641 (off position) to position 643 which is its automatic operation. Quick connect couplers 561, 563 are connected to counterpart adapters which are in turn connected, one each to one side of the accessed fluid circulation circuit 530, in this case a fluid cooling circuit of an automatic transmission.

The engine is started and the transmission is placed in Park, Neutral or Drive to render the transmission operative to circulate fluid into its fluid circulation (cooling) circuit or other accessible fluid circuit. Fresh fluid pumping chamber 522 is filled with fresh fluid from the prior fluid exchange and used fluid working chamber 524 is essentially filled with used fluid from the prior fluid exchange. Chambers 520 and 526 are essentially empty of fluid (the chambers could contain reciprocally corresponding fractions of their capacity depending on where the last fluid exchange left piston assembly 514 relative to the cylinder body 501).

Position sensors 525, 527, when contacted by the piston 516, 518 indicate when each corresponding chamber is depleted of used fluid. Sensor 525 signals to microprocessor 631 that chamber 526 is essentially empty of used fluid. Microprocessor 631 activates or deactivates solenoid coil 627 to bias the spool valve 619 to its lower position under power of its return spring 628 (as shown). Spool valve 619 establishes fluid communication between ports 597 and 583 during the venting/exhausting/discharge of the used fluid contained in chamber 524 into receiver 581. Spool valve 619 establishes fluid communication between ports 593 and 587 so that used fluid will be pumped under power of the transmission's fluid circulation pump into chamber 526, which causes chamber 522 to discharge its fresh fluid into conduit 545, through checkvalve 549, conduit 559, and through quick connect 561 to return to the transmission circuit 530. Checkvalve 551 prevents that fresh fluid from chamber 522 from entering chamber 520 and vice-versa when the reciprocating cycle is reversed.

Simultaneously with the expulsion of fresh fluid from chamber 522, fresh fluid flows into chamber 520 under the low pressure in chamber 520 caused by the upward movement of piston 518.

Pistons 516, 518 upwardly move until piston 518 contacts position indicator 527 to signal the microprocessor 631 that the chamber 524 depletion of used fluid. The microprocessor deactivates/activates the solenoid 627 to raise spool valve 619 to its upper position, reversing the operations of the reciprocating assembly 500. The timing of this deceleration, stop and reversal of the movement of piston assembly may be dictated by the instructions contained in the memory of microprocessor 631. This reciprocating cycle is continued until completion of the exchange procedure.

Figure 9:
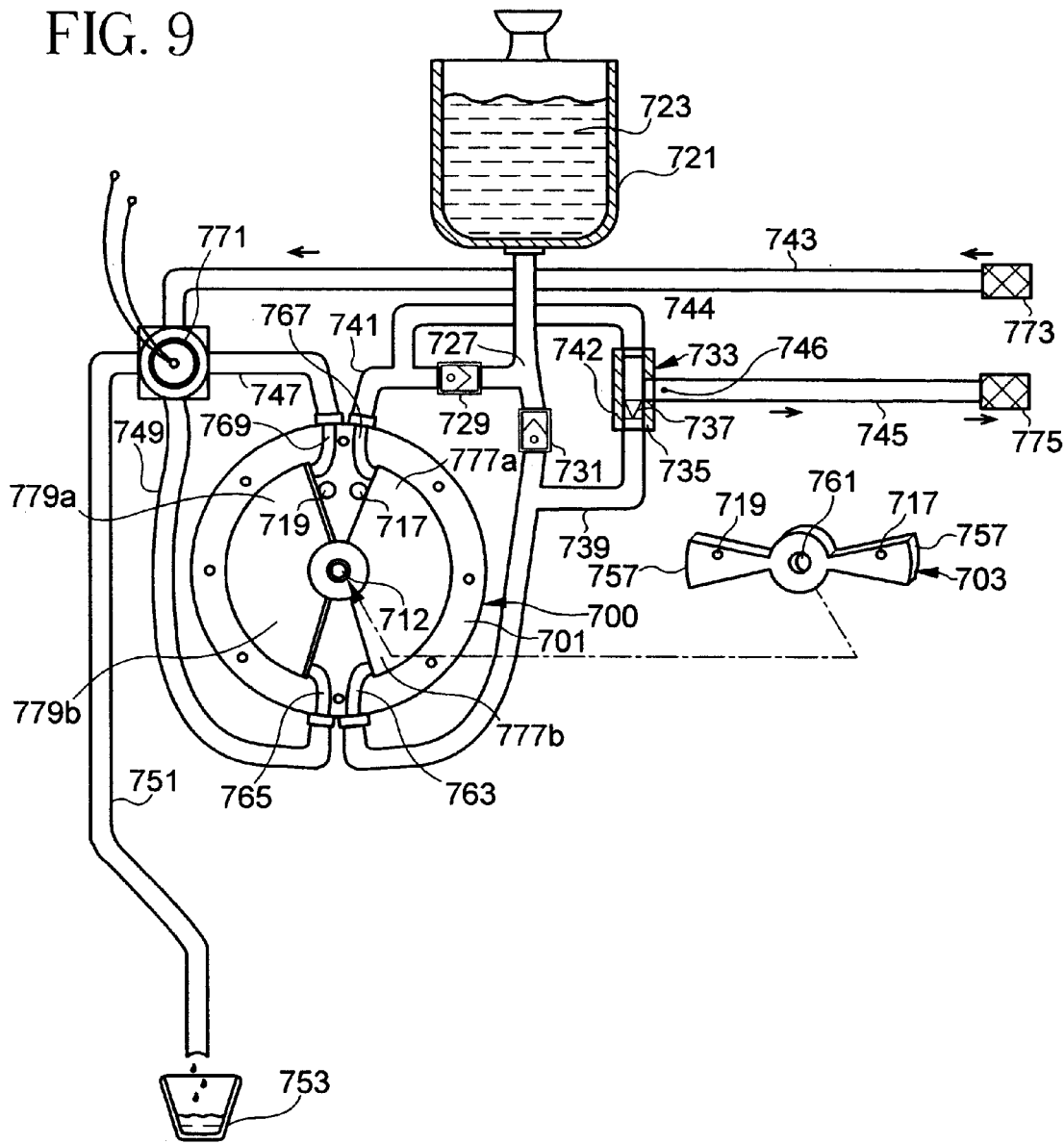
FIG. 9 schematically illustrates a third embodiment of a fluid exchange system according to the present invention
Figure 10:
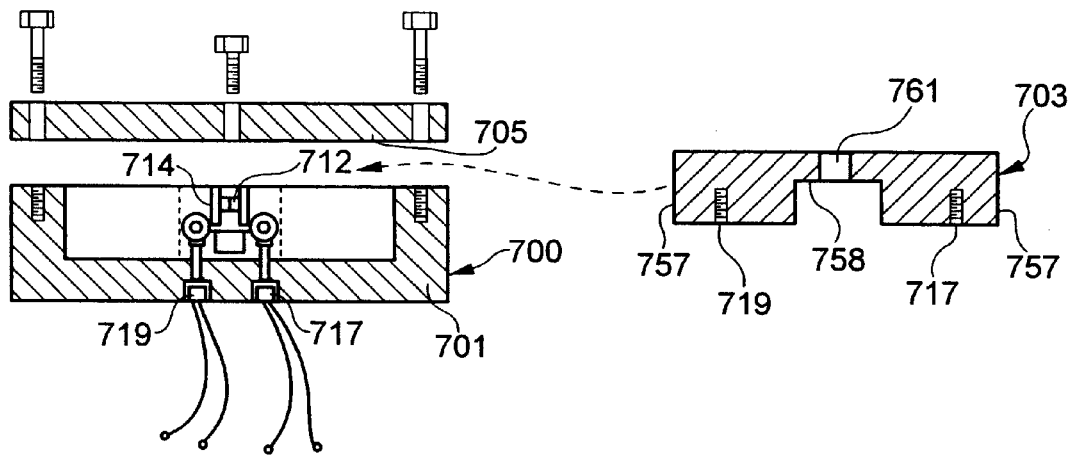
FIG. 10 is an elevational view of particular components of the fluid exchange system of FIG. 9.
Figure 11:
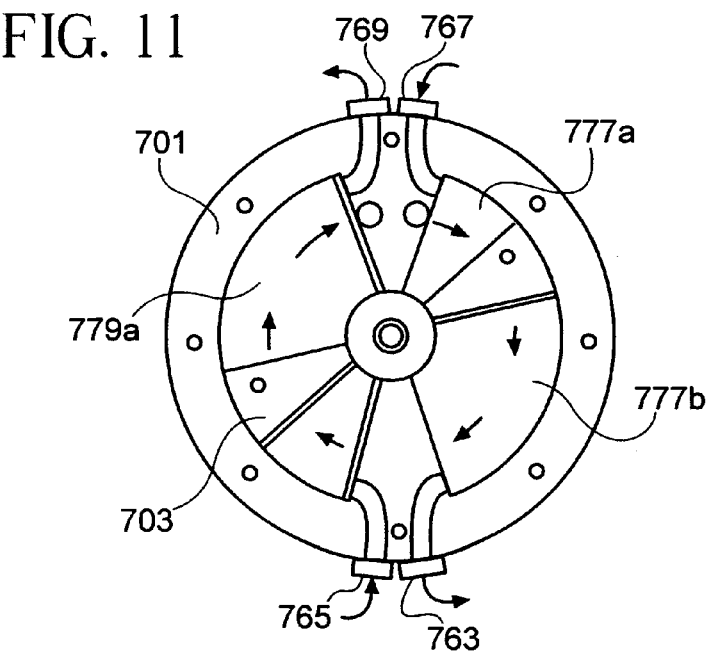
FIG. 11 is a top plan view of particular components of the fluid exchange system of FIG. 9.

FIGS. 9–11 illustrate another preferred embodiment of the present invention. A reciprocator assembly 700 (also shown in Figure B) is includes a rotor assembly 703, a rotor receiving body 701, and a cover member 705. Rotor assembly 703 is received into the body with center aperture 761 of rotor 703 engaging center bearing post 712. Bearing surface 714 engages bearing surface 758 of the retained rotor assembly 703. Rotor assembly 703 has magnetic position sensors 717, 719 to signal the position of the rotor assembly 703 within the body 701 for control purposes.

In combination, the rotor assembly 703, body 701, and cover member 705 together define a pair of working (used) fluid chambers 779a, b and a pair of pumping (fresh) fluid chambers 777a, b as with the earlier-described embodiments, the volumes of the chambers 777, 779 vary with the relative reciprocal position of the rotor 703 within the body 701.

Reciprocator body 701 and rotor 703 are constructed with clearances to allow a relatively free movement of rotor 703 reciprocally within the body 701. In part, sealing between the defined fluid chambers 777, 779 of rotor 703 and reciprocator body 701 is accomplished by minimizing the clearances between rotor sliding surfaces 757 and the body 701.

Reciprocator body 701 has four fluid ports, a pair of bi-directional fresh fluid ports 763, 767, and a pair of bi-directional used fluid ports 765, 769. Fresh fluid port 767 is coupled to a bi-directional fresh fluid conduit 741. Bi-directional used fluid port 769 is coupled to a used fluid conduit 747. Fresh fluid port 763 is coupled to a bi-directional fresh fluid conduit 739. Used fluid port 765 connected to a bi-directional used fluid conduit 749. A fresh fluid reservoir 721 contains a fresh fluid 723. Tank 721 is connected to a fresh fluid fill conduit 727 which is in turn connected to both a check valve 729 and a check valve 731. A controlled four way valve 771 is connected to a used fluid inlet delivery hose 743, a used fluid discharge conduit 751, a fluid conduit 747 to port 769, and to fluid conduit 749 to port 765. Operation of the valve 771 (mechanically or by a control circuit) controls the introduction of used fluid into the appropriate working fluid chamber 779a or 779b.

Conduit 751 drains into a used fluid receiver 753. Conduit 743 terminates at a female quick connect 773 which is coupled to the outlet side of an accessed fluid circulation system by suitable adapter means (not shown).

A priority valve assembly 733 includes of a valve body 735 and valve slide 737. Valve body 735 has two ends ports, an end port 744 which is connected to conduit 741 and an end port 742 which is connected to conduit 739. Valve body 735 has a side port 746 which is connected to a fresh fluid outlet delivery hose 745 which terminates at a female quick connect 775. Female quick connect 775 is connected to the return side of the accessed fluid circulation system by suitable adapter means (not shown). The function of the priority valve 733 is to mechanically control the flow of fresh fluid from an appropriate pumping chamber 777 to the output conduit 745.

If desired a boost pump can be used on conduit 743. An electrical pressure differential switch can be used to control the boost pump to prevent excessive fluid flows of the system.

Similar to the operation of the above described exchange structures, the fluid exchange apparatus of FIGS. 9–11 is coupled to an accessed fluid circuit through quick connect couplers 773, 775. Used fluid is introduced into the pump assembly 700 through port 769, or port 765 as controlled by the valve 771. The pressurized used fluid from the accessed fluid circuit reacts within the pump assembly to bias rotor 703 with the fluid chambers 777, 779 experiencing a resulting volumetric change.

Position sensors 717, 719, which may be magnetic sensors or other known sensors, are used to indicate the relative position of the rotor 703 within the body 701. A controller may receive a position sensor signal to appropriately alter the valve 771 to cyclically direct the pressurized used fluid into the working fluid chambers 779a, b.

Figure 12:
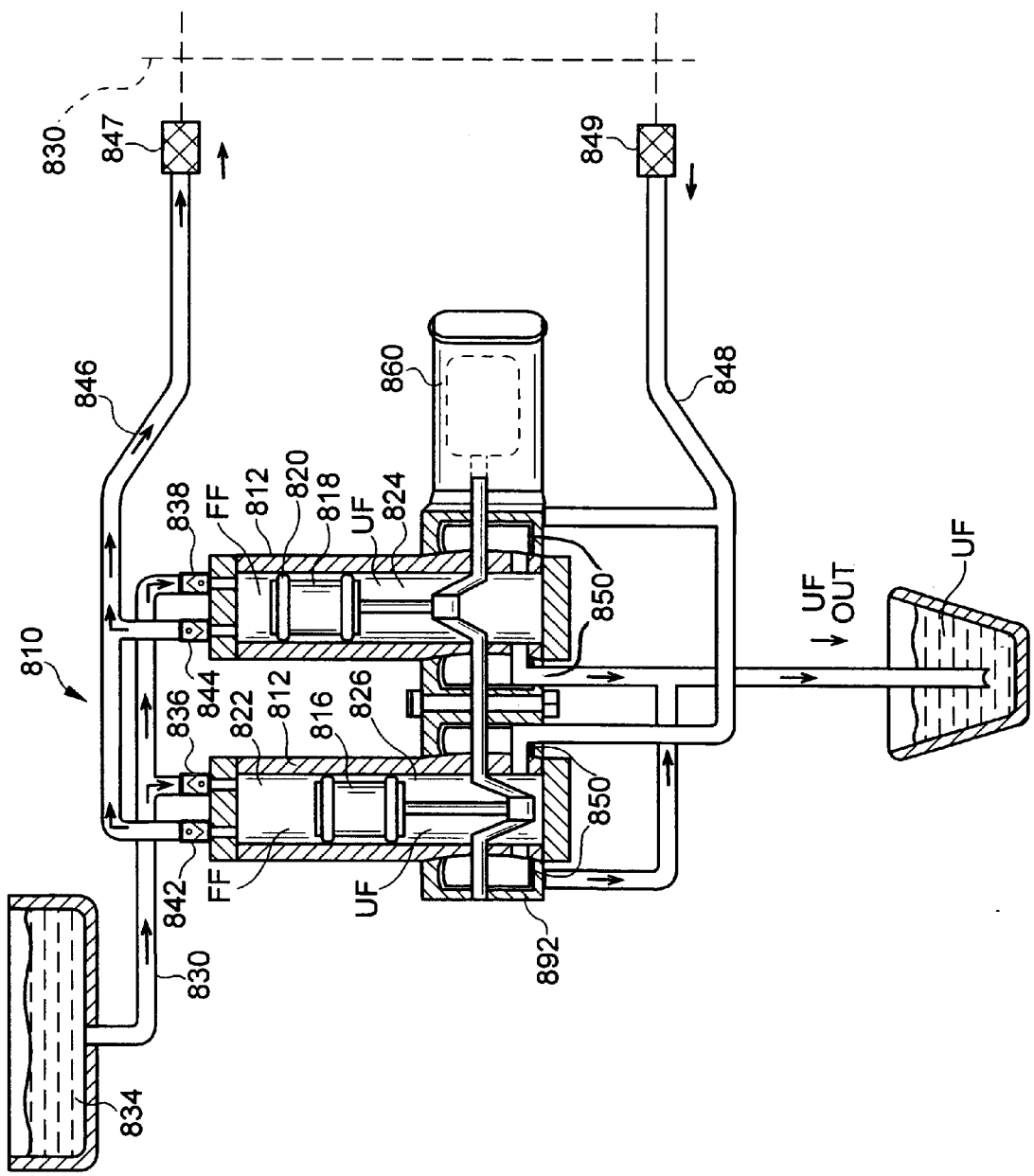
FIG. 12 schematically illustrates a fourth embodiment of a fluid exchange system according to the present invention.

Referring now to FIG. 12, another preferred embodiment of the present invention is illustrated. The pump assembly 810 of this embodiment includes a pair of pistons 816, 818 reciprocating on a crank assembly 892 within a cylinder housing 812. Pumping fluid chambers 820, 822 are defined between the top faces of the pistons 816, 818 and the walls of the cylinder housing 812. Working fluid chambers 824, 826 are defined between the bottom faces of the pistons 816, 818 and the walls of the cylinder chamber 812. Fresh fluid intake into the pumping fluid chambers 820, 822 is through fresh fluid conduits 830 from a fresh fluid reservoir 834. Unidirectional check valves 836 838 control the fluid flow into the pumping fluid chambers 820, 822. Fresh fluid expulsion into the accessed hydraulic fluid circuit is through unidirectional check valves 842, 844, fresh fluid conduits 846 and coupling 847. Piston 816, 818 movement within the cylinder 812 is regulated by the crank assembly 892 so that pistons 816, 818 are displaced in opposite directions (one drawing fresh fluid into the pumping chamber and one expelling fresh fluid in an alternate manner).

Used fluid from the accessed hydraulic fluid circuit 830 via coupling 849 is directed into one or the other working fluid chambers 824, 826 through associated used fluid conduits 848. Rotary valving 850 may be used to control the timing and flow of used fluid into alternating working fluid chambers. The rotary valving 850 may be replaced with alternative valving as appreciated by those skilled in the relevant arts. It is appreciated that the purpose of the valving is to direct used pressurized fluid into a working fluid chamber 824, 826 to drive the associated piston 816, 818 upwardly (and as a result of crank 892 action, drive the other piston 816, 818 downwardly). In this manner, used fluid is being directed into a first working chamber 824 from the accessed hydraulic circuit 830, used fluid is being expelled into a used fluid receptacle 881 by the other working chamber 826, and simultaneously, fresh fluid is alternatively being drawn into the pump assembly 810 into a first pumping chamber 820, and fresh fluid is being expelled into the accessed hydraulic circuit 830 by a second pumping chamber 822. The cyclic procedure continuing until interruption by the operator, fresh fluid reservoir depletion, etc. An additional feature of the system may include an auxiliary power supply 860 for assisting in the pumping process. Such a power supply 860 may be an electric motor (constant or variable speed) directly or intentionally coupled to the crank assembly. An electric motor may be controlled via a control system (not shown) or a mechanical clutch system to provide a fluid boost when required. Operation of the auxiliary power supply 860 may thus be limited to particular hydraulic circuit systems requiring boost power to effect the fluid exchange.

Figure 13:
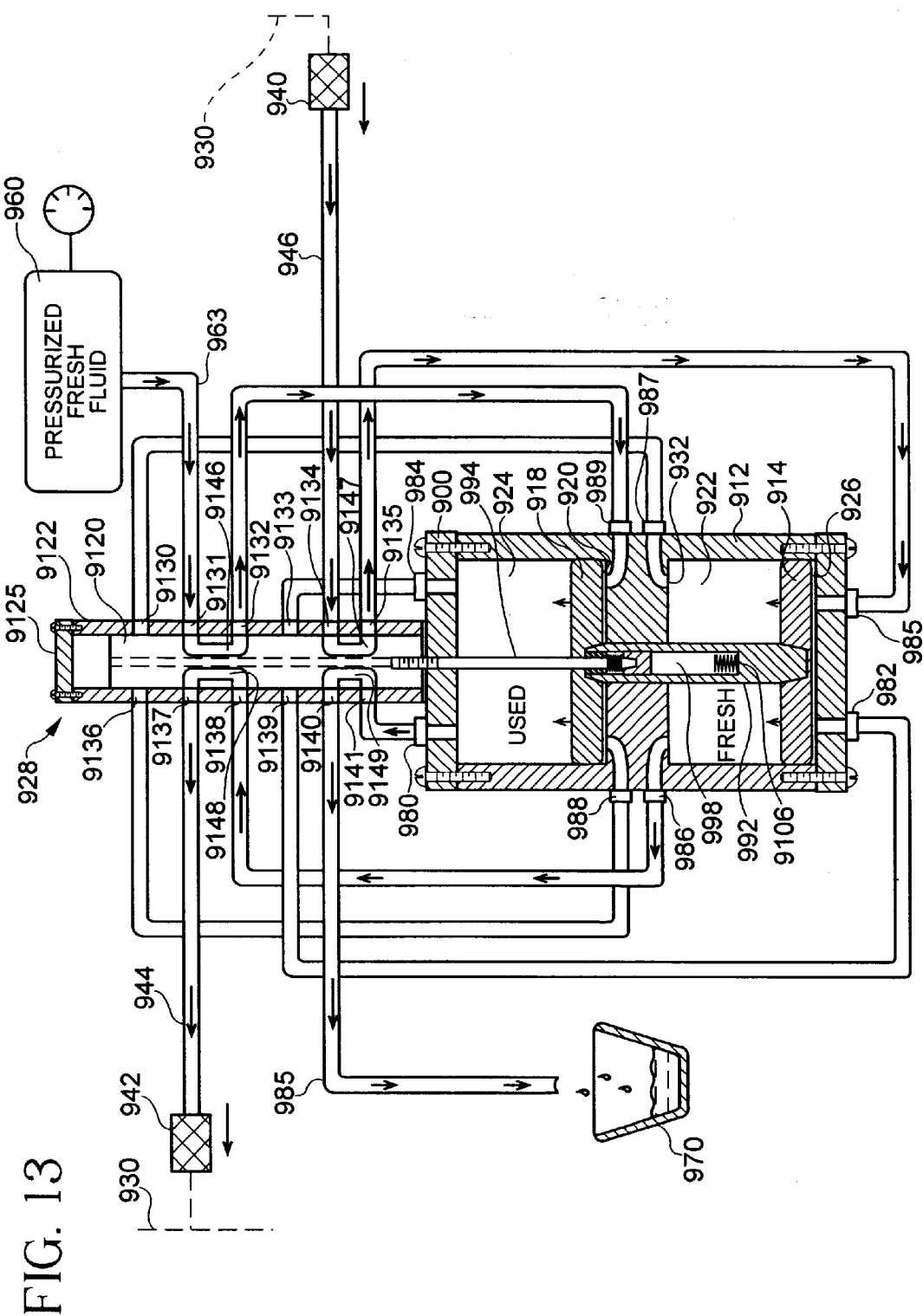
FIG. 13 schematically illustrates a fifth embodiment of a fluid exchange system according to the present invention.
Figure 14:
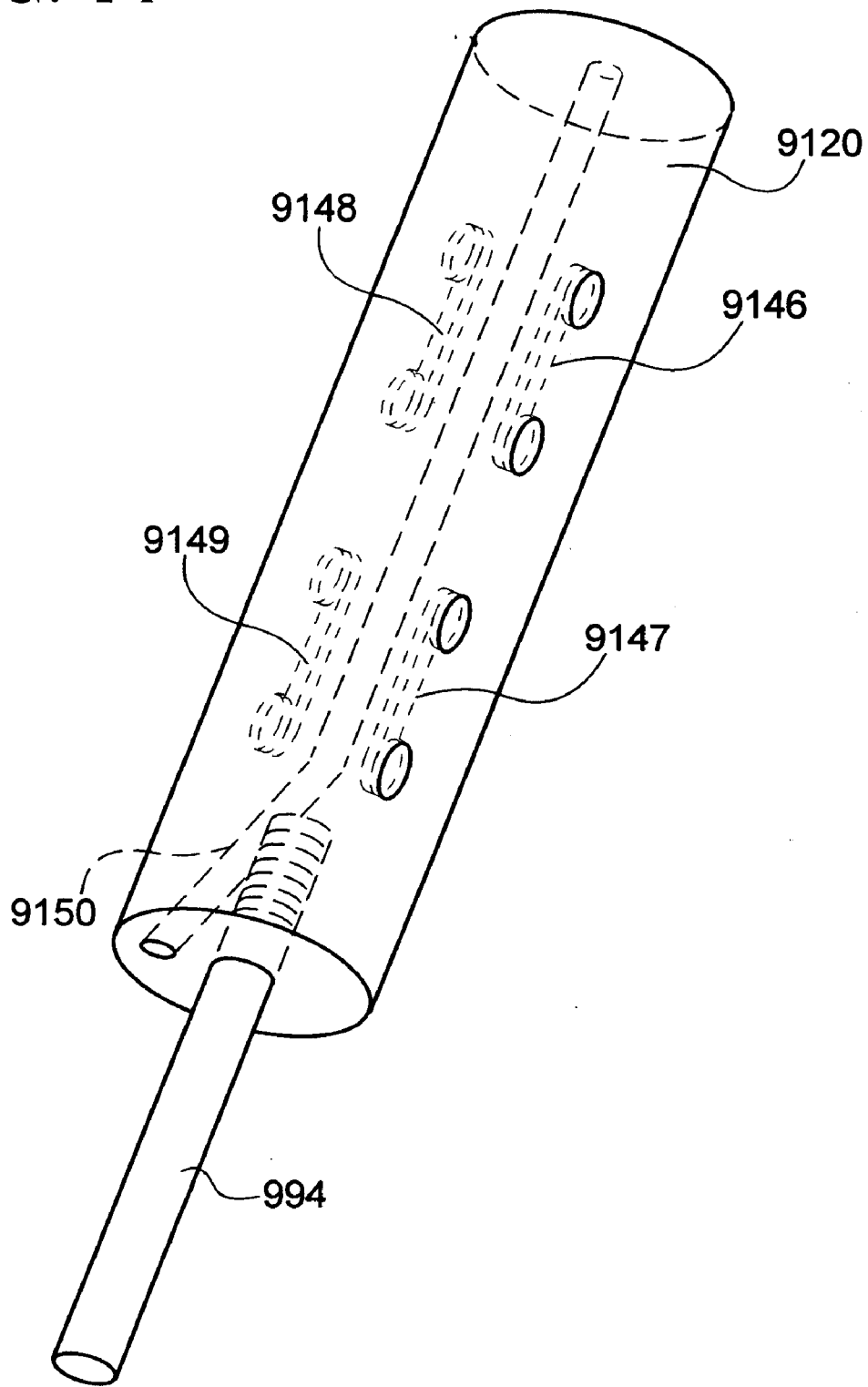
FIG. 14 is a perspective view of particular components of the fluid exchange system of FIG. 13.

Yet another embodiment of the present invention is illustrated in FIGS. 13 & 14. The invention of the present application includes a reciprocating pump assembly 900 having a rigid cylinder body 912 and an interiorly-received dual fluid separation structure 914. In this preferred embodiment the dual fluid separation structure 914 is a dual piston 916, 918 assembly. The cylinder body 912 and dual piston assembly 914 together define two fresh fluid working chambers 920, 922 disposed substantially between the outer piston ends 916, 918 of the dual piston assembly 914. Two used fluid pumping chambers 924, 926 are also defined and are disposed away from the working chambers 920, 922 and within the cylinder body 912. The working chambers 920, 922 receive pressurized fluid from a pressurized fresh fluid reservoir 960. Fluid flow relative to the pump assembly 900 is controlled by an actuated control valve assembly 928. The pressurized fluid, used as a power medium to drive the reciprocating pump 910, may be supplied by an external source. The pumping chambers 924, 926, on the other hand, simultaneously expel used fluid into the used fluid receptacle 970 from the circuit 930. The working chambers 920, 922 are interconnected by a guide bore 932 which passes through the cylinder body 912. In operation, the volumes of each of the chambers 920, 922, 924, 926 are variable and determined by the relative position of the dual piston assembly 914 within the cylinder assembly 912. In this embodiment, the working chambers 920, 922 are coaxial with the pumping chambers 924, 926. It should be appreciated that the working chambers 920, 922 and pumping chambers 924, 926 are of a substantially cylindrical shape in this preferred embodiment, however, other configurations are possible.

The pump assembly 900 is interconnected to an accessed hydraulic fluid circuit 930 through quick-connect fluid couplers 490, 942, and fluid conduits 944, 946. Used hydraulic fluid from the accessed hydraulic circuit 930 enters the exchange apparatus through quick-connect coupler 940 and a fresh hydraulic fluid flows out of the exchange apparatus and through quick-connect coupler 942. The flow rate of the used and fresh hydraulic fluid is substantially equivalent during the exchange process. The pump assembly 900 is additionally coupled to a bulk fluid reservoir 960 or similar external fresh fluid source through associated fluid conduit 962. The pump assembly 900 is additionally coupled to an external used fluid receptacle 970, such as an oil drain or external tank of typical vehicle maintenance facilities. A flow alignment device, as illustrated in applicant's existing U.S. Pat. No. 5,472,064, may be utilized to practice the present invention.

Still referring to FIG. 1, a plurality of orifices 980, 982, 984, 985, 986, 987, 988, 989 are interconnected to the pump assembly 900 at the pumping chambers 924, 926 and the working chambers 920, 922, each of which is adapted to provide fluid communication from or into respective chambers. Working chambers 920, 922 are fluidly coupled to receive fresh hydraulic fluid from the hydraulic source 960 through ports 987 and 989. Working chambers 920, 922 are additionally fluidly coupled to permit discharge of the fresh hydraulic fluid to the accessed hydraulic circuit 930 through ports 986 and 988. As described herein, the fluid flow through respective fluid ports is controlled by a spool valve assembly 928. Depending on the local pressure conditions, pumping chambers 924, 926 are fluidly coupled to either the used fluid receptacle 970 or the inlet conduit 946.

Control valve assembly 928 includes an actuated spool or spool valve 9120, valve body 9122 and cap 9125. Valve body 9122 includes a plurality of ports 9132, 9134, 9136, 9138, 9140, 9142, 9144 providing fluid communication through the valve assembly 928. Spool valve 9120 is slidably received into the valve body 9122. Spool valve 9120 includes a plurality of concentric fluid passageways 9146, 9147, 9148, 9149 which permit fluid to communicate between opposed ports of the valve body 9122. Additionally, spool valve 9120 includes a vent passageway 9150.

The closed fluid circulation system of an automatic transmission or other hydraulic fluid circuit 930 is accessed to provide fluid interconnection of the invention such that used fluid can be received from the fluid circuit 930 and fresh fluid can be simultaneously introduced by the invention to thereby replace the spent fluid. Suitable adapters (not shown) terminating in quick connectors are utilized to allow quick and convenient connection of conduit to a spent fluid outlet side of the accessed fluid circuit and to the return line side of the fluid circuit. Fresh fluid (pump power medium) is received into the pump assembly 910 at one of the working fluid chambers 920, 922 selected by the spool valve assembly 928 (based on the existing position of spool valve 9120). Referring to FIG. 13, used fluid from the transmission circuit 930 is introduced into the lower pumping fluid chamber 926 through port 985. The used fluid cannot be vented out of the used fluid chamber 926 since the spool valve 928 blocks fluid from port 982. As the fresh fluid enters working fluid chamber 920 through port 989, piston assembly 914 is forced upward (FIG. 13 depicts the condition of the spool valve 928 immediately subsequent to its transition). As piston assembly 914 is upwardly displaced, each of the four fluid chambers 920, 922, 924, 926 simultaneously experience a change in volumetric conditions: the upper pumping fluid chamber 924 is discharging used fluid to a used fluid receptacle 970, the upper working chamber 920 is receiving a charge of fresh fluid from the fresh fluid reservoir 960, the lower pumping chamber 926 is receiving used fluid from the accessed transmission circuit 930, and the lower working chamber 922 is introducing fresh fluid into the accessed transmission circuit 930.

It is understood that even though numerous characteristics and advantages of the present invention have been disclosed in the foregoing description, the disclosure is illustrative only and changes may be made in detail. Other modifications and alterations are within the knowledge of those skilled in the art and are to be included within the scope of the appended claims.

I claim:

1. A method of exchanging fresh fluid from a fresh fluid source for used fluid from an accessed hydraulic fluid circuit having an outlet port and an inlet port, said method comprising the steps of:

providing a pump assembly having a pump body and a movable pump member disposed relative the pump body, said pump assembly defining at least a first and a second working chamber each having a port for communicating with the used fluid and at least a first and a second pumping chamber each having a port for communicating with the fresh fluid;

providing a control structure in communication with the fresh fluid and the used fluid and the pump assembly, said control structure having at least a first control condition and a second control condition;

for a first predetermined period of time, providing the control structure in the first control condition, wherein the first working chamber is fluidly coupled to the outlet port of the accessed hydraulic circuit, and the second working chamber is fluidly coupled to a used fluid receptacle, and the second pumping chamber is fluidly coupled to the fresh fluid source, and the first pumping chamber is fluidly coupled to the inlet port of the accessed hydraulic fluid circuit, thereby providing a flow of used fluid from the outlet port of the accessed hydraulic circuit into the first working chamber, a flow of used fluid from the second working chamber into the used fluid receptacle, a flow of fresh fluid from the fresh fluid source into the second pumping chamber, and a flow of fresh fluid from the first pumping chamber into the inlet port of the accessed hydraulic circuit;

after said first predetermined period of time, providing the control structure in the second control condition for a second predetermined period of time, wherein the second working chamber is fluidly coupled to the outlet port of the accessed hydraulic circuit, and the first working chamber is fluidly coupled to the used fluid receptacle, and the first pumping chamber is fluidly coupled to the fresh fluid source, and the second pumping chamber is fluidly coupled to inlet port of the accessed hydraulic fluid circuit, thereby providing a flow of used fluid from the outlet port of the accessed hydraulic circuit into the second working chamber, a flow of used fluid from the first working chamber into the used fluid receptacle, a flow of fresh fluid from the fresh fluid source into the first pumping chamber, and a flow of fresh fluid from the second pumping chamber into the inlet port of the accessed hydraulic circuit;

after said second predetermined period of time, establishing a cycle by returning the control structure to the first control condition for said first predetermined period of time; and repeating the cycle to achieve the fluid exchange.

2. The method of exchanging fluid according to claim 1, wherein the movable pump member is selected from among the group containing: a diaphragm member and a piston member.

3. The method of exchanging fluid according to claim 1, wherein the first and second working chamber and the first and second pumping chambers are either longitudinally or radially aligned.

4. The method of exchanging fluid according to claim 1, wherein the control structure includes one or more elements selected from among the group containing: directional control valves, spool valves, and electromagnetic valves.

5. A fluid exchange assembly for replacing used fluid from an accessed hydraulic circuit with fresh fluid from a fresh fluid source, said assembly comprising:

a pump structure, having at least four variable volume fluid chambers: a first working fluid chamber, a second working fluid chamber, a first pumping fluid chamber and a second pumping fluid chamber, each fluid chamber having at least one fluid port;

a control structure, operatively coupled to the pump structure, said control structure having a first control condition and a second control condition;

a first conduit for receiving used fluid from the accessed hydraulic circuit;

a second conduit for introducing fresh fluid into the accessed hydraulic circuit;

a third conduit operatively coupling the first conduit to the first working fluid chamber when the control structure is in the first control condition, and operatively coupling the first conduit to the second working fluid chamber when the control structure is in the second control condition;

a fourth conduit operatively coupling the second working fluid chamber to a used fluid receptacle when the control structure is in the first control condition, and operatively coupling the first working fluid chamber to the used fluid receptacle when the control structure is in the second control condition;

a fifth conduit operatively coupling the second conduit to the first pumping chamber when the control structure is in the first control condition, and operatively coupling the second conduit to the second pumping fluid chamber when the control structure is in the second control condition; and a sixth conduit operatively coupling the second pumping fluid chamber to a fresh fluid source when the control structure is in the first control condition, and operatively coupling the first pumping fluid chamber to the fresh fluid source when the control structure is in the second control condition.

6. The fluid exchange assembly according to claim 5, wherein the movable pump member is selected from among the group containing: a diaphragm member and a piston member.

7. The fluid exchange assembly according to claim 5, wherein the first and second working chamber and the first and second pumping chambers either longitudinally or radially aligned.

8. The fluid exchange assembly according to claim 5, wherein the control structure includes one or more elements selected from among the group containing: directional control valves, spool valves, and electromagnetic valves.

9. A method of exchanging fresh fluid from a fresh fluid source for used fluid from an accessed hydraulic fluid circuit having an outlet port and an inlet port, said method comprising the steps of:

providing a pump assembly having a pump body and a reciprocating pump member disposed relative the pump body, said pump assembly defining at least a first and a second, working chamber each having a port for communicating with the used fluid, and at least a first and a second pumping chamber each having a port for communicating with the fresh fluid;

providing a control structure in communication with the pump assembly, said control structure having at least a first control condition and a second control condition;

for a first predetermined period of time, providing the control structure in the first control condition, wherein the first working chamber is fluidly coupled to the outlet port of the accessed hydraulic circuit, and the second working chamber is fluidly coupled to a used fluid receptacle, and the second pumping chamber is fluidly coupled to the fresh fluid source, and the first pumping chamber is fluidly coupled to the inlet port of the accessed hydraulic fluid circuit, thereby providing a flow of used fluid from the outlet port of the accessed hydraulic circuit into the first working chamber, a flow of used fluid from the second working chamber into the used fluid receptacle, a flow of fresh fluid from the fresh fluid source into the second pumping chamber, and a flow of fresh fluid from the first pumping chamber into the inlet port of the accessed hydraulic circuit;

after said fist predetermined period of time, providing the control structure in the second control condition for a second predetermined period of time, wherein the second working chamber is fluidly coupled to the outlet port of the accessed hydraulic circuit, and the first working chamber is fluidly coupled to the used fluid receptacle, and the first pumping chamber is fluidly coupled to the fresh fluid source, and the second pumping chamber is fluidly coupled to inlet port of the accessed hydraulic fluid circuit, thereby providing a flow of used fluid from the outlet port of the accessed hydraulic circuit into the second working chamber, a flow of used fluid from the first working chamber into the used fluid receptacle, a flow of fresh fluid from the fresh fluid source into the first pumping chamber, and a flow of fresh fluid from the second pumping chamber into the inlet port of the accessed hydraulic circuit;

after said second predetermined period of time, establishing a cycle by returning the control structure to the first control condition for said first predetermined period of time; and repeating the cycle to achieve the fluid exchange.

10. The method of exchanging fluid according to claim 9, wherein the pump assembly is selected from among a group containing: a dual diaphragm pump and a dual piston pump.

11. The method of exchanging fluid according to claim 9, wherein the pump assembly includes a crank assembly and a plurality of piston assemblies operatively coupled to the crank assembly.

12. The method of exchanging fluid according to claim 9, wherein the control structure includes a plurality of directional check valves.

13. A fluid exchange assembly for replacing used fluid from an accessed hydraulic circuit with fresh fluid from a fresh fluid source, said assembly comprising:

a pump structure, having at least four variable volume fluid chambers: a first working fluid chamber, a second working fluid chamber, a first pumping fluid chamber and a second pumping fluid chamber, each fluid chamber having at least one fluid port;

a control structure, operatively coupled to the pump structure, said control structure having a first control condition and a second control condition;

a first conduit for receiving used fluid from the accessed hydraulic circuit, said first conduit being coupled to the first working fluid chamber when the control structure is in the first control condition, and said first conduit being coupled to the second working fluid chamber when the control structure is in the second control condition; and a second conduit for receiving fresh fluid from the pump structure and conducting fresh fluid to the accessed hydraulic circuit, said second conduit being coupled to the second pumping fluid chamber when the control structure is in the first control condition, and said second conduit being coupled to the first pumping fluid chamber when the control structure is in the second control condition.

14. A fluid exchange assembly according to claim 13, said assembly further comprising:

a used fluid receptacle; and a third conduit for receiving used fluid from the pump structure and conducting used fluid to the used fluid receptacle, said third conduit being coupled to the second working fluid chamber when the control structure is in the first control condition, and said third conduit being coupled to the first working fluid chamber when the control structure is in the second control condition.

15. A fluid exchange assembly according to claim 13, said assembly further comprising:

a forth conduit for receiving fresh fluid from the fresh fluid source and conducting fresh fluid to the pump structure, said forth conduit being coupled to the second pumping fluid chamber when the control structure is in the first control condition, and said forth conduit being coupled to the first pumping chamber when the control structure is in the second control condition.

16. A fluid exchange assembly according to claim 13, wherein the control structure is a mechanical control assembly, including a spool valve and a valve body.

17. A fluid exchange assembly according to claim 13, wherein the pump structure is selected from among a group containing: a dual diaphragm pump, a dual piston pump, and a reciprocating element pump.

18. A fluid exchange assembly according to claim 13, wherein the control structure includes a plurality of directional control valves.

19. A fluid exchange assembly according to claim 18, wherein the control structure includes a pair of directional control valves coupled to each of the first and second pumping fluid chambers.

20. A reciprocating fluid exchange apparatus for exchanging fresh fluid with used fluid from an accessed transmission circuit, said exchange apparatus, composing:

a reciprocating pump having a body and an interiorly received reciprocating element, together said body and said reciprocating element defining at least a first working fluid chamber, and a second working fluid chamber, and a first pumping fluid chamber, and a second pumping fluid chamber;

a first conduit for receiving used fluid from the accessed transmission circuit;

a second conduit for supplying fresh fluid to the accessed transmission circuit; and a control structure operatively coupled to the first conduit and the second conduit for directing used fluid from the accessed transmission circuit alternately into the first working fluid chamber and then the second working fluid chamber causing a movement of the reciprocating element to direct fresh fluid disposed in a selected one of the first and second pumping fluid chambers into the second conduit assembly to be introduced into the accessed transmission circuit.

21. The reciprocating fluid exchange apparatus according to claim 20, wherein the control structure includes a plurality of directional control valves.

* * * * *